US009853755B2

(12) United States Patent
Jaisimha et al.

(10) Patent No.: US 9,853,755 B2
(45) **Date of Patent: *Dec. 26, 2017**

(54) METHOD AND SYSTEM FOR ACHIEVING CONTINUED LISTENING EXPERIENCE FOR CAR RADIO HEAD UNIT

(71) Applicant: Panasonic Automotive Systems Company of America, Division of Panasonic Corporation of North America, Peachtree City, GA (US)

(72) Inventors: Shree Jaisimha, Senoia, GA (US); Kazuo Morita, Yokohama (JP); John Morris, Fayetteville, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/353,071

(22) Filed: Nov. 16, 2016

(65) Prior Publication Data

US 2017/0070303 A1 Mar. 9, 2017

Related U.S. Application Data

(63) Continuation of application No. 15/046,181, filed on Feb. 17, 2016, now Pat. No. 9,531,487, which is a (Continued)

(51) Int. Cl.
*H04B 1/18* (2006.01)
*H04H 20/71* (2008.01)

(Continued)

(52) U.S. Cl.
CPC ............ *H04H 20/71* (2013.01); *H04H 20/22* (2013.01); *H04H 20/26* (2013.01); *H04H 40/27* (2013.01);

(Continued)

(58) Field of Classification Search
None
See application file for complete search history.

(56) References Cited

U.S. PATENT DOCUMENTS 6,804,510 B1 * 10/2004 Bates ..................... H04H 20/24 455/154.1
6,829,475 B1 * 12/2004 Lee ........................ G01C 21/26 455/345

(Continued)

OTHER PUBLICATIONS

ETSI Technical Specification: Hybrid Digital Radio (DAB, DRM, RadioDNS); XML Specification for Service and Programme Information (SPI), Jan. 2015, ETSI TS 102 818, V3.1.1, European Broadcasting Union, Digital Audio Broadcasting; http://www.etsi.org/deliver/etsi_ts/102800_102899/102818/03.01.01_60/ts_102818v030101p.pdf.

*Primary Examiner* — Mohammed Rachedine
(74) *Attorney, Agent, or Firm* — Laurence S. Roach, Esq.

(57) ABSTRACT

A method of operating a radio in a vehicle includes tuning the radio to a first radio source. Information identifying the first radio source is transmitted from the vehicle to a remote processor. The processor monitors broadcast content of the first radio source on a web site. The processor identifies a second radio source having broadcast content matching the broadcast content of the first radio source. Information identifying the second radio source is transmitted from the processor to the vehicle. When a quality of a broadcast signal from the first radio source received at the vehicle falls below a threshold quality level, tuning of the radio is switched from the first radio source to the second radio source.

20 Claims, 3 Drawing Sheets

Related U.S. Application Data continuation of application No. 13/754,204, filed on Jan. 30, 2013, now Pat. No. 9,300,413.

(51) Int. Cl.

| | |
|---|---|
| ***H04H 20/22*** | (2008.01) |
| ***H04H 20/26*** | (2008.01) |
| ***H04H 60/41*** | (2008.01) |
| ***H04H 60/51*** | (2008.01) |
| ***H04H 40/27*** | (2008.01) |
| ***H04H 60/31*** | (2008.01) |

(52) U.S. Cl.

CPC ............ *H04H 60/31* (2013.01); *H04H 60/41* (2013.01); *H04H 60/51* (2013.01); *H04H 2201/37* (2013.01)

(56) References Cited

U.S. PATENT DOCUMENTS

| | | | | |
|---|---|---|---|---|
| 8,023,883 | B1 * | 9/2011 | Lee .................... | G06Q 30/0273<br>348/729 |
| 2011/0306313 | A1 * | 12/2011 | Jaisimha ................ | H04H 20/22<br>455/185.1 |

* cited by examiner

| | Before Event | | | After Event | |
|---|---|---|---|---|---|
| | Front User | Rear User | Event | Front User | Rear User |
| Current state of Art | Listening to FM Traffic station using onboard tuner | Listening to FM Traffic station using onboard tuner | EON Traffic occurs | Tunes to Traffic Announcement station which is different from last tuned station | Forced to tune to Traffic Announcement |
| With proposal mentioned in this submission | Listening to FM Traffic station using onboard tuner | Listening to FM Traffic station using onboard tuner | EON Traffic occurs | Tunes to Traffic Announcement station which is different from last tuned station | Can continue listening to earlier station through the IP Link |
| With proposal mentioned in this submission | Tunes to Traffic Announcement station | Listening to FM station | EON Traffic Ends | Listening to FM Traffic station using onboard tuner | Switches back to Listening to FM Traffic station using onboard tuner of current tuned station instead of using IP Link |

FIG. 3

METHOD AND SYSTEM FOR ACHIEVING CONTINUED LISTENING EXPERIENCE FOR CAR RADIO HEAD UNIT

CROSS-REFERENCE TO RELATED APPLICATION

This application is a continuation of U.S. patent application Ser. No. 15/046,181, filed on Feb. 17, 2016 which is currently under allowance, which is a continuation of U.S. patent application Ser. No. 13/754,204, filed on Jan. 30, 2013, which is now U.S. Pat. No. 9,300,413, Issued on Mar. 29, 2016, the disclosure of which are hereby incorporated by reference in its entirety for all purposes.

BACKGROUND OF THE INVENTION

1. Field of the Invention

The present invention relates to radios for use in vehicles, and, more particularly, to maintaining continuity of the radio listening experience in vehicles.

2. Description of the Related Art

The TiVo® concept of time shift operation has been applied to vehicle head units for all sources. This technique allows a listener to go back in temporal time in order to listen to broadcast segments that the listener missed due to stopping for gas or a telephone call, for example.

In North America, the high power transmitters have a fixed broadcast coverage area. That is, a user listening to a station cannot continue to listen to the station after he or she has driven out of the station's broadcast coverage area. This applies for both AM and FM broadcast bands inclusive of HD IBOC (in-band on-channel). Currently there is no means to achieve service following, in other words, continuous national coverage, for an analog/digital broadcast station in North America.

Radio head units are known to store audio and meta data to a nonvolatile memory such as a hard disk or SRAM for time shift operation. A disadvantage of this method is the high cost of the memory required in the head unit to store sixty minutes of time shifting. Another disadvantage is that storing and retrieving content from the hard drive or flash results in wear and early failure of these components. Another disadvantage is that digital audio sources employ compressed audio for transmission. For example, digital audio broadcasting (DAB) uses MPEG audio compression methods; and HD Radio uses MPEG SBR. Thus, there is a design tradeoff between whether to store the decoded data audio for time shifting, or store the raw compressed audio stream for time shifting and decompress the compressed audio when the user triggers a time shift operation. Both methods entail design complexity, CPU loading, and additional costs to design for storage.

Instead of time shift operation, broadcast following operation may be realized in digital audio broadcasting (DAB), which is digital. If digital reception is lost, then there is fallback to the FM analog band for what is termed DAB FM Service Link. The assumption is that there is simulcast audio on both DAB and FM (analog) frequencies and that broadcast following operation can be achieved in Europe and Rest Of World that adopt DAB broadcasting.

Broadcast following operation may also be realized in HD IBOC digital broadcast. When the HD IBOC signal is lost on the main program service, there is HD FM Blending to the FM analog fall back to achieve continuity operation.

The known methods do not address the problem of stations which do not support HD IBOC, such as pure analog FM stations, do not have broadcast continuity when the vehicle head unit travels beyond the transmitter broadcast span. The market scope of this is North America and Mexico where HD IBOC is prevalent.

The known methods also do not address the problem of HD IBOC stations which operate in the SPS (not main channel), i.e., on the side bands per the OFDM modulation of HD IBOC. Such stations do not have a fall back method to the analog station frequency in case the signal is lost, leading to loss of audio. The market scope of this is North America and Mexico where HD IBOC is prevalent.

The known methods also do not address the further problem of DAB stations with no hard link. FM analog simulcast information requires mute of audio when digital broadcast is lost. The market scope of this is Europe and Rest Of World (excluding North America and Mexico).

Pure on board implementation entails warranty costs in the case where storage is on hard disk drives. Pure on board implementation also increases material costs for the hard disk and SRAM and drives up design complexity costs.

On the other hand, a problem with pure off board implementation, assuming that the car head unit has access to the off-board services with the use of an embedded modem or cell-phone link, is that it is based on the subscription plan, and thus consumes minutes of the subscription plan with associated monetary costs.

SUMMARY OF THE INVENTION

The present invention reduces the amount of cell phone time consumed while maintaining good audio performance and realizing time shift operation in a car radio head unit.

The present invention may include the novel feature of applying time shift operation selectively by analyzing the user preference and user patterns using the following criteria:

1) The user (e.g., the driver) has selected time shift as an option in the radio configuration option;
2) The user has stored the station as a preset frequency. For example, the user may have recorded the frequency of the station in association with a preset pushbutton such that the radio automatically tunes to the frequency of the station in response to a user pressing the preset pushbutton;
3) The user listens to a station frequently throughout the drive. For example, the user may tune to a station more than a threshold number of times within a predetermined time period (e.g., three times within twenty minutes). As another example, the user may listen to the station for a relatively large percentage of the drive time (e.g., more than 15% of the drive time), for a relatively large percentage of the time spent listening to audio during the drive time (e.g., more than 20% of the time spent listening to audio during the drive time), or a relatively large percentage of the time spend listening to the radio during the drive (e.g., more than 25% of the time spent listening to the radio during the drive time). Thus, the time shifting operation is not applied when the user is scanning or surfing the broadcast band; and
4) The time shifting operation may be applied when the user stops at a gas stations or rest stop en route to a final destination, which can be gathered from the input feed of the navigation system.

The present invention may also include the novel feature that only audio of an acceptable quality level is stored. In contrast, in the current state of the art, time shift operation is applied by the radio head unit without gauging the quality of the audio that is stored. As such, the radio can be tuned to an FM station which has heavy multipath and this audio can nevertheless be stored in the onboard buffer.

When an end user tunes to a station, there may be a timer-based check for the quality of the currently tuned station. The quality check may include the bit error rate of there is digital content, and field strength, multipath, and adjacent energy if there is analog content from an analog station.

The invention comprises, in one form thereof, a method of operating a radio in a vehicle, including using the radio to tune to a first radio source. Information identifying the first radio source is transmitted from the vehicle to a processor disposed at a location that is remote from the vehicle. The processor is used to monitor broadcast content of the first radio source on a web site of the first radio source. The processor is used to identify a second radio source having broadcast content matching the broadcast content of the first radio source. Information identifying the second radio source is transmitted from the processor to the vehicle. It is detected when a quality of a broadcast signal from the first radio source received at the vehicle falls below a threshold quality level. In response to the detecting step, tuning of the radio is switched from the first radio source to the second radio source.

The invention comprises, in another form thereof, a method of operating a radio in a vehicle, including using the radio to tune to a radio source. Information identifying the radio source is transmitted from the vehicle to a processor disposed at a location that is remote from the vehicle. A quality of a broadcast signal from the radio source received at the vehicle is measured. Information regarding the measured quality of the broadcast signal is transmitted from the vehicle to the processor. The processor is used to record broadcast content of the radio source from a web site of the radio source. The broadcast content is recorded only if the measured quality of the broadcast signal is above a threshold level. The recorded broadcast content of the radio source is transmitted from the processor to the vehicle.

The invention comprises, in yet another form thereof, a method of operating a radio within a vehicle, including using the radio to tune to a radio source. Information identifying the radio source is transmitted from the vehicle to a processor disposed at a location that is remote from the vehicle. A quality of a broadcast signal from the radio source received at the vehicle is measured. Information regarding the measured quality of the broadcast signal is transmitted from the vehicle to the processor. The processor is used to record broadcast content of the radio source from a web site of the radio source. The broadcast content is recorded only if the radio source has been stored as a preset frequency and/or the radio has been tuned to the radio source for more than a threshold amount of time. The recorded broadcast content of the radio source is transmitted from the processor to the vehicle.

An advantage is that the present invention may provide an alternative method to ensure listener audio continuity for the driver or end user.

Another advantage of the present invention is that it takes into consideration transmitter diversity, meaning diversity from single frequency terrestrial broadcast transmitter(s) and also the cell phone transmitters, taking into account that broadcast stations have started using multi mediums to target the audience.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 3 is a chart of illustrating differences between the current state of the art in handling traffic announcements and one embodiment of a method of the present invention for operating a single tuner radio head in conjunction with an IP link.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
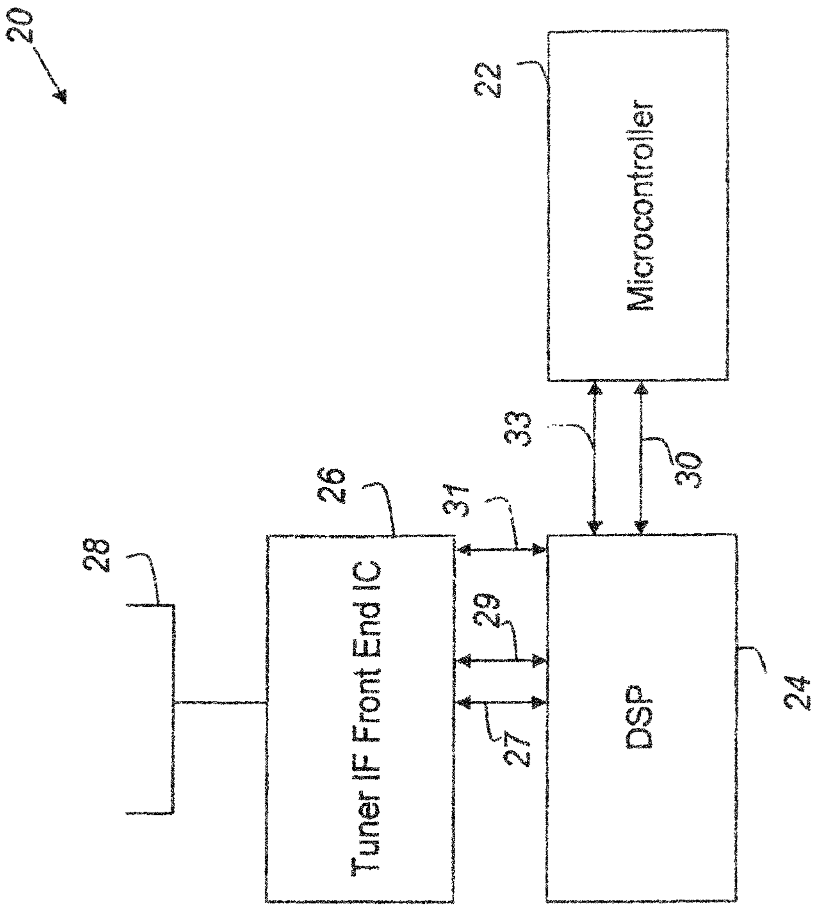
FIG. 1 is a block diagram illustrating one embodiment of a single tuner radio head system of the present invention.

Referring now to the drawings, and particularly to FIG. 1, there is shown one embodiment of a single tuner radio head system 20 of the present invention. Radio head system 20 may include a microcontroller 22 which may be used to process user input. Microcontroller 22 may include on-ship memory for storage of content. A digital signal processor (DSP) 24 may be used to provide audio demodulation of the air-borne IF input signal. DSP 24 may also be used to provide quality information parameters to the main microcontroller 22 via a serial communication protocol such as I2C. The quality information parameters may include multipath, adjacent channel noise, FM frequency offset, FM modulation and field strength. The I2C channel may be a dedicated channel so that delays due to shared resource contentions are prevented. DSP 24 may rely on a Tuner IC 26 to perform the front end RF demodulation and the gain control. Tuner IC 26 may also output the Intermediate Frequency to DSP 24 where the Intermediate Frequency may be demodulated and processed. Tuner IC 26 may further provide a gain to the IF (Intermediate Frequency) signal of up to 6 dBuV prior to forwarding the signal to DSP 24. Communication between Tuner IC 26 and DSP 24, as indicated at 27, may be via a serial communication protocol such as I2C, which may operate at 400 kbps.

An antenna system 28 may be communicatively coupled to Tuner IC 26. Antenna system 28 may be in the form of a passive mast, or an active mast of phase diversity, for example.

An AF sample line 29 and an AF hold line 31 provide an interface between DSP 24 and Tuner IC 26 to coordinate a quick mute as described hereinbelow. A pause interrupt line 33 between DSP 24 and microcontroller 22 may be used to inform microcontroller 22 whenever a pause occurs.

DSP 24 may provide signal quality parameterization of demodulated tuner audio and may make it available to microcontroller 22 via a serial bus 30. In one embodiment, serial communication bus 30 is in the form of a 400 kbps high speed I2C.

When the user tunes to a station, the station identification may be gathered based on the currently tuned band. The meaning of this pertains to the specific broadcast band, such as:

1) service ID for DAB;
2) Main Program Service (MPS), Supplemental Program Service (SPS) information for HD IBOC;

3) for an FM analog station, the call letters or frequency together with the GPS location, whereby the currently tuned station may be identified in view of a localized area; and 4) the PI (program ID) code for an RDS station.

The radio head system may publish its capability in terms of different tuner sources at a hardware level of the radio head system. The reason for this is to enable an external server to make a recommendation when the currently tuned station on a specific ban exhibits poor quality.

Figure 2:
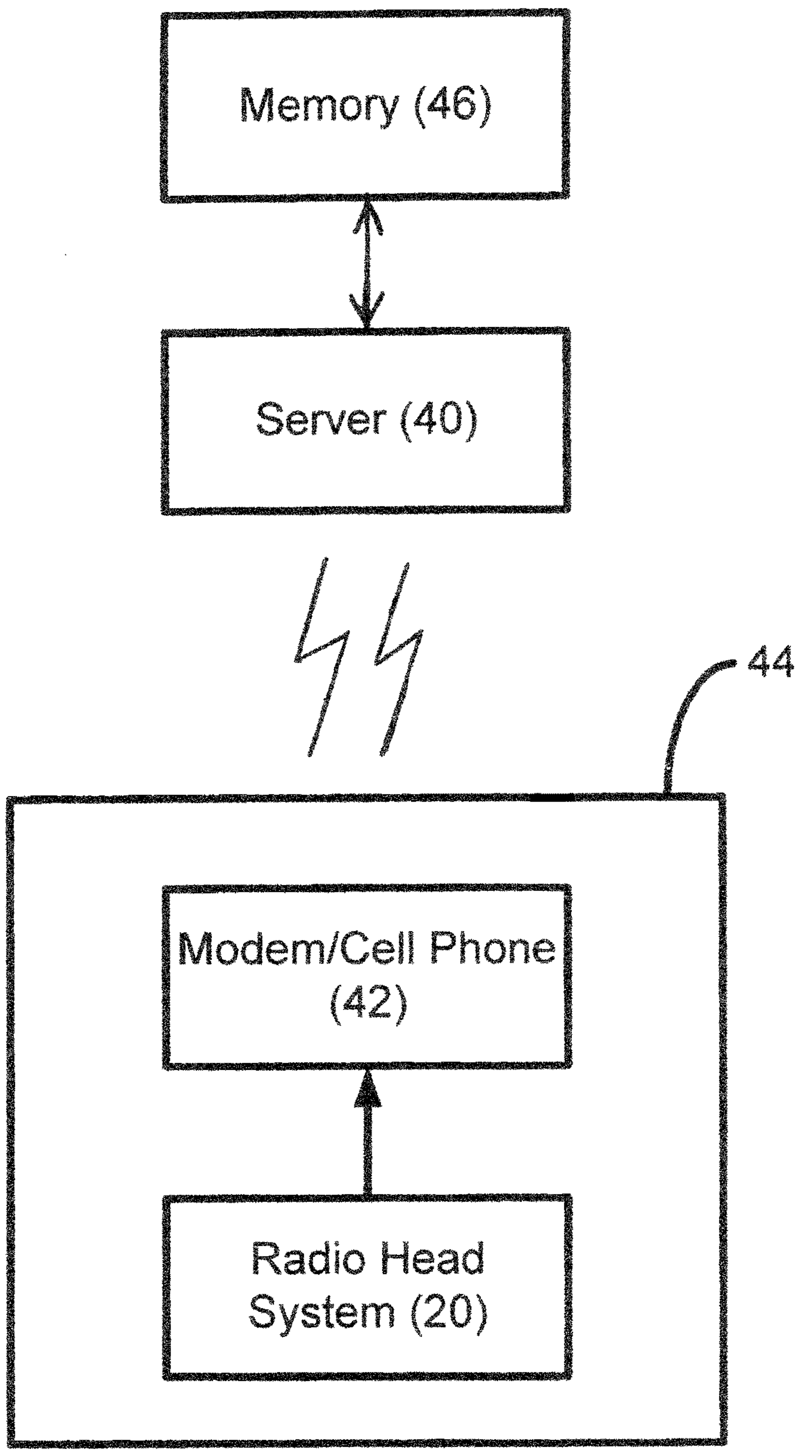
FIG. 2 is a block diagram of a vehicle including the radio head system of FIG. 1 in communication with an external server.

The user preferences may be stored in a history log along with timings for listened station attributes (e.g., frequency, SID, call letters, channel ID or PI code), and along with the GPS location to collate against a database which has the broadcast station's URL link. The gathered information may then be sent to an off-board server 40 (FIG. 2) via an embedded modem or cell phone 42 within vehicle 44. Transmitter maps are available in websites such as fmscan-.org. The radio head unit may also periodically send out the quality metrics of the current tuned station frequency to web server 40 in order for web server 40 to gauge in the web server's decision process.

Web server 40 may use this a priori information to check through the database for the current tuned station's cyber station URL. For this, server 40 spawns threads to the station URLs which arise from the above-mentioned criteria and starts storing the streamed audio data in an off-board memory device 46. Compression schemes may be used to make the storage efficient. This avoids the need for the car receiver head unit to store the streamed audio data, and avoids complexity in the vehicle's chip set.

The link between the external server 40 (e.g., in the cloud) is established. Periodically, sixty seconds of compressed audio data is transferred from cloud server 40 to the radio head unit. Thus, if the user decides to exercise the time shift operation, any delays involved in the setting up of the IP link may be masked by use of the sixty seconds of locally stored audio data.

Server 40 may additionally use the sources available at the radio head unit and command the radio head unit to switch to a different broadcast band that plays the same simulcast audio or substantially similar audio content. That is, the switched to radio source or broadcast band may have some different content as compared to the currently listened to radio source, such as different commercials or station identifications. However, if at least most of the broadcast content of the second radio source is the same as or matches the broadcast content of the second radio source, then the listener may be satisfied with the second radio source as a replacement for the first radio source.

For broadcast following operation, when the user is listening to a broadcast station, the quality metrics available for the current tuned station may be monitored. In the case of an analog FM station, the criteria of field strength, multipath and ultrasonic noise may be gathered from the radio DSP used in the head unit. Field strength may give an indication of signal reception and may help determine whether the radio station has good signal coverage in the vicinity of the user. This field strength quality parameter may be applicable for both AM and FM modulation signal reception.

Although the signal can have high field strength, it can be subject to reflections which can arise from trees and tall building which reflect/deflect the signal. The multipath parameter may enable the level of multipath to be ascertained, and may affect reception quality. The multipath quality parameter may be applicable for both AM and FM modulation signal reception.

With regard to the ultrasonic noise quality parameter, it sometimes happens that stations over-modulate their signal leading to adjacent channel interference. For example, in the U.S., FM frequencies are spaced apart 200 kHz. There can arise times in which an adjacent station over-modulates its signal past the 75 kHz modulation and beyond the 50 kHz guard band, which may result in the adjacent station being heard on the tuned-to station's frequency. This ultrasonic noise quality parameter may be applicable only for FM modulation signal reception. Ultrasonic noise also arises in cases where a neighboring station next to the current listened station has a high field strength which results in the neighbor station's spectrum overlapping with the spectrum of the current listened station, thereby causing audio distortion.

In the case of an analog AM or FM HD IBOC station or digital DAB station, the bit error rate average may be gathered from the Radio DSP used in the head unit. The bit error rate average may provide an indication of signal reception quality, and may help determine or predict whether the tuned signal is going to undergo impending loss of reception.

When a user tunes to a station, the identification of the tuned station may be gathered based on the current tuned band. The form of the identification may depend upon the specific broadcast band. For example, the identification may be in the form of a service identification (SID) for DAB. For HB IBOC, the identification may be in the form of MPS and/or SPS information. For an FM analog station, the identification may be in the form of the call letters of the station or the frequency together with the vehicle's GPS location. Thereby, the current tuned station may be identified within the context of a localized area. For an RDS station, the identification may be in the form of the PI (program identification) code.

The user preferences may be stored in a history log along with the timings for the listened station attributes (e.g., frequency, SID, call letters, or PI code) along with the vehicle GPS location to collate against a database which has the broadcast station's URL link. The gathered information may then be sent to an off-board server via an embedded modem or cell-phone. The web-server then may spawn threads to the station URL and may start monitoring the same tuned station. In the event that the quality levels of the current tuned station at the radio head unit goes below a threshold, then the radio head unit may initiate what may be termed IP link, as described in more detail below. This method may work well for the North America and Mexico market segments where there is no broadcast continuity beyond the transmitter coverage span.

The cloud server may use the information of different hardware capability sources (e.g., AM/FM tuner, SiriusXM tuner, HD IBOC capability) and can likewise also provide information to the car radio Head Unit regarding another station in the same OR different broadcast band which is transmitting the same simulcast data. This may include the radio head unit switching from one source to another source that transmits the same simulcast audio signal or data stream. For example, the radio head unit may switch from FM to DAB; from FM to SiriusXM, or from one FM station to another FM station. This method may be particularly effective for stations such as National Public Radio which broadcasts in different broadcast bands and frequencies.

In the European and Rest of World markets, the above-described broadcast following operation may provide an inexpensive alternative to the DAB-to-DAB linking which requires a costly secondary DAB tuner to do the shift. The above-described broadcast following operation may also provide an inexpensive alternative to seamless FM linking in two ways. First, the method may enable the radio head unit to switch to any source which the radio hardware is capable of receiving in order to thereby provide broadcast continuity to the end user. Second, the method may enable a single DAB tuner to be used to initiate the link.

The present invention provides a cost effective solution to realize listener broadcast continuity using an external server via the cloud to support service continuity either through the digital to terrestrial to IP link and/or via a recommendation engine which proposes an alternative station to tune to on a different source which is supported by the radio head unit.

The method of the invention may use off-board services and a priori information from a car radio head unit such as quality metrics and user preferences to trigger the links when needed. The inventive method also may provide service following for the North America market to enable the end user or driver to continue listening to his local station as he/she drives away from the current state to the next state when tuned to HD IBOC Main Channel, Secondary channels and/or analog stations.

Although the current state of the art includes multi-tuner radios such as dual tuners and triple tuners, only the main tuner in these permutations allows for both audio and data (e.g., RDS, HD) demodulation, while the second and third tuners support only data decoding. The current state of the art for DSP is such that due to processing power limitations, only one FM demodulation instance is allowed for both audio demodulation and RDS and/or HD decoding. As such, even in multi-zone situations, both the front and rear seat users may have to listen to the same currently tuned station due to the current state of the art limitation of being able to demodulate only one FM signal flow for both. In Europe there are traffic announcements which relate to another embodiment of the invention as described below.

As described above, the radio head system in a vehicle may publish its capabilities to an external server to gauge the current limitations of the radio head unit. The capabilities may be expressed in terms of different tuner sources at a hardware level of the radio head system, e.g., whether the radio includes a single tuner, dual tuner, or a triple tuner, and how many audio instances are allowed with the present on board hardware. Then a decision may be made on ensuring bandwidth for sessions between the external server and onboard radio head unit. The reason for this is to enable an external server to make a recommendation when the currently tuned station on a specific ban exhibits poor quality.

An internet protocol (IP) link may enable the end supplier to offer more service while avoiding the increased hardware costs of multiple tuners, and overcoming technology constraints such as only a single tuner for audio demodulation.

An embodiment for real live European radio constraint with multi-zones is shown in FIG. 3. "EON" represents an other network station transmitting a traffic announcement such that the radio end user has to tune to a different station in order to listen to the traffic announcement. Traffic announcements are needed for the driver and not so much for the rear seat end user, but the rear seat end user has to listen to the traffic announcement due to the current technology limitations of only the main tuner being able to produce audio. By enabling the rear user to utilize the IP link, the rear seat end user may continue listening to the station that he is currently listening to instead of being forced to tune to the traffic announcement. Thus, the IP link may effectively function as an additional tuner without the hardware expense of an additional tuner.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of operating a radio in a vehicle, comprising the steps of:

using the radio to tune to a first radio source;

transmitting information identifying the first radio source from the vehicle to a processor disposed at a location that is remote from the vehicle;

monitoring by the processor broadcast content of the first radio source on a web site of the first radio source;

identifying by the processor a second radio source having broadcast content matching the broadcast content of the first radio source;

transmitting information identifying the second radio source from the processor to the vehicle;

detecting a quality of a broadcast signal from the first radio source received at the vehicle falling below a threshold quality level; and responding to the detecting step by switching tuning of the radio from the first radio source to the second radio source.

2. The method of claim 1 comprising the further steps of:

transmitting geographical coordinates of the vehicle from the vehicle to the processor, the geographical coordinates being provided by a GPS; and using the geographical coordinates at the processor to identifying the first radio source.

3. The method of claim 1 wherein the signal quality metric is dependent upon at least one of field strength, level of multipath, ultrasonic noise, and bit error rate.

4. The method of claim 1 wherein the information identifying the first radio source comprises:

service identification if the first radio source comprises digital audio broadcasting;

Main Program Service (MPS) and/or Supplemental Program Service (SPS) information if the first radio source comprises HD IBOC;

if the first radio source comprises an FM analog station, then a vehicle GPS location and at least one of call letters of the station and a broadcast frequency of the station; and a program ID (PI) code if the first radio source comprises an RDS station.

5. The method of claim 1 wherein the step of using the processor to identify a second radio source having broadcast content matching the broadcast content of the first radio source includes monitoring broadcast content of the second radio source on a web site of the second radio source.

6. The method of claim 1 comprising the further steps of:

measuring a quality of a broadcast signal from the second radio source received at the vehicle;

transmitting information regarding the measured quality of the broadcast signal from the second radio source from the vehicle to the processor;

using the processor to record broadcast content of the second radio source from a web site of the second radio source, the broadcast content being recorded when the measured quality of the broadcast signal from the second radio source is above a threshold level; and transmitting the recorded broadcast content of the second radio source from the processor to the vehicle.

7. The method of claim 6 wherein the broadcast content of the second radio source is recorded when the second radio source has been stored as a preset frequency and/or the radio has been tuned to the second radio source for more than a threshold amount of time.

8. A method of operating a radio in a vehicle, comprising the steps of:

using the radio to tune to a radio source;

transmitting information identifying the radio source from the vehicle to a processor disposed at a location that is remote from the vehicle;

measuring a quality of a broadcast signal from the radio source received at the vehicle;

transmitting information regarding the measured quality of the broadcast signal from the vehicle to the processor;

recording by the processor broadcast content of the radio source from a web site of the radio source, the broadcast content being recorded when the measured quality of the broadcast signal is above a threshold level; and transmitting the recorded broadcast content of the radio source from the processor to the vehicle.

9. The method of claim 8 wherein the quality of the broadcast signal is dependent upon at least one of field strength, level of multipath, and ultrasonic noise.

10. The method of claim 8 wherein the broadcast content is recorded when the radio has been receiving the broadcast signal from the radio source for greater than a threshold amount of time.

11. The method of claim 8 wherein the broadcast content is recorded when the user has selected time shift for a configuration of the radio.

12. The method of claim 8 wherein the radio source comprises a first radio source, the method comprising the further step of automatically switching tuning of the radio from the first radio source to a second radio source having broadcast content matching the broadcast content of the first radio source, the switching being performed when the measured quality of the broadcast signal is below the threshold level.

13. The method of claim 12 comprising the further steps of:

using the processor to monitor broadcast content of the first radio source on a web site of the first radio source; and using the processor to identify the second radio source as having broadcast content matching the broadcast content of the first radio source.

14. The method of claim 8 wherein the information identifying the radio source comprises:

service identification if the radio source comprises digital audio broadcasting;

Main Program Service (MPS) and/or Supplemental Program Service (SPS) information if the radio source comprises HD IBOC;

if the radio source comprises an FM analog station, then call letters of the station and/or a broadcast frequency of the station; and a program ID (PI) code if the radio source comprises an RDS station.

15. A method of operating a radio within a vehicle, comprising the steps of:

using the radio to tune to a radio source;

transmitting information identifying the radio source from the vehicle to a processor disposed at a location that is remote from the vehicle;

measuring a quality of a broadcast signal from the radio source received at the vehicle;

transmitting information regarding the measured quality of the broadcast signal from the vehicle to the processor;

recording by the processor broadcast content of the radio source from a web site of the radio source, the broadcast content is recorded when the radio source has been stored as a preset frequency and/or the radio has been tuned to the radio source for more than a threshold amount of time; and transmitting the recorded broadcast content of the radio source from the processor to the vehicle.

16. The method of claim 15 wherein the broadcast content is recorded when the measured quality of the broadcast signal is above a threshold level.

17. The method of claim 15 wherein the quality of the broadcast signal is dependent upon at least one of field strength, level of multipath, and ultrasonic noise.

18. The method of claim 15 wherein the broadcast content is recorded when time shift is currently selected as the configuration of the radio.

19. The method of claim 15 wherein the radio source comprises a first radio source, the method comprising the further step of automatically switching tuning of the radio from the first radio source to a second radio source having broadcast content substantially similar to the broadcast content of the first radio source, the switching being performed when the measured quality of the broadcast signal is below the threshold level.

20. The method of claim 19 comprising the further steps of:

using the processor to monitor broadcast content of the first radio source on a web site of the first radio source; and using the processor to identify the second radio source as having broadcast content substantially similar to the broadcast content of the first radio source.

* * * * *